United States Patent
Itoh et al.

(10) Patent No.: US 7,049,793 B2
(45) Date of Patent: May 23, 2006

(54) BOOST SWITCHING POWER SUPPLY (75) Inventors: Kazuyuki Itoh, Tokyo (JP); Katsuaki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 36 days.

(21) Appl. No.: 10/380,262

(22) PCT Filed: Sep. 19, 2001

(86) PCT No.: PCT/JP01/08135

§ 371 (c)(1),
(2), (4) Date: Mar. 11, 2003

(87) PCT Pub. No.: WO02/25798

PCT Pub. Date: Mar. 28, 2002

(65) Prior Publication Data
US 2004/0036451 A1 Feb. 26, 2004

(30) Foreign Application Priority Data
Sep. 20, 2000 (JP) ............................. 2000-285548

(51) Int. Cl.
*G05F 1/652* (2006.01)
(52) U.S. Cl. ..................... 323/222; 323/223; 323/224
(58) Field of Classification Search ................ 323/222, 323/223, 224, 225
See application file for complete search history.

(56) References Cited

U.S. PATENT DOCUMENTS 3,864,619 A * 2/1975 Tanaka et al. ............... 363/135
5,418,704 A   5/1995 Hua et al. ..................... 363/21

(Continued)

FOREIGN PATENT DOCUMENTS

JP  1-311862  12/1989

(Continued)

OTHER PUBLICATIONS

Shimada M. et al., "Single-Switch Auxiliary Resonant Converters," *PCC Nagaoka '97, Sanken Electric Co., Ltd.*, pp. 811-814, 1997.

*Primary Examiner*—Bao Q. Vu
(74) *Attorney, Agent, or Firm*—Seed IP Law Group PLLC (57) ABSTRACT

The present invention provides a boost switching power supply with low switching loss. The boost switching power supply of the present invention includes a coil portion 3a and a first diode 4 that are serially connected between one terminal of a DC power source 2 and one terminal of a first capacitor 5 for smoothing, a first switching element 8 connected between a node A where the coil portion 3a and the first diode 4 are connected and the other terminal of the DC power source 2, a second magnetic element 7 and a second switching element 9 that are serially connected between the node A and the other terminal of the DC power source 2, and a second diode 10 and a second capacitor 11 that are serially connected between a node where the second magnetic element 7 and the second switching element 9 are connected and the node A. According to the present invention, the switching loss of the second switching element 9 is reduced substantially because when the second switching element 9 turns ON, the increase of the current flowing in the second switching element 9 is restricted by the second magnetic element 7 and when the second switching element 9 turns OFF, the increase in voltage across the electrodes of the second switching element is restricted by the charging the second capacitor 11.

13 Claims, 7 Drawing Sheets

U.S. PATENT DOCUMENTS

| | | | | |
|---|---|---|---|---|
| 5,543,704 A | * | 8/1996 | Thoren | 323/222 |
| 5,815,386 A | * | 9/1998 | Gordon | 363/50 |
| 5,914,587 A | * | 6/1999 | Liu | 323/222 |
| 5,923,153 A | * | 7/1999 | Liu | 323/222 |
| 6,028,418 A | * | 2/2000 | Jovanovic et al. | 323/222 |
| 6,060,867 A | * | 5/2000 | Farrington et al. | 323/222 |
| 6,236,191 B1 | * | 5/2001 | Chaffai | 323/225 |
| 6,483,726 B1 | * | 11/2002 | Chen et al. | 363/21.18 |
| 6,690,143 B1 | * | 2/2004 | Lin et al. | 323/222 |
| 6,710,582 B1 | * | 3/2004 | Watanabe | 323/222 |

FOREIGN PATENT DOCUMENTS

| | | |
|---|---|---|
| JP | 3-117362 | 5/1991 |
| JP | 4-372572 | 12/1992 |
| JP | 7-241072 | 9/1995 |
| JP | 8-308219 | 11/1996 |
| JP | 9-322541 | 12/1997 |
| WO | WO 92/16044 | 9/1992 |
| WO | WO 98/35432 | 8/1998 |

* cited by examiner

BOOST SWITCHING POWER SUPPLY

BACKGROUND OF THE INVENTION

1. Field of the Invention

The present invention relates to a boost switching power supply, and more specifically, to a boost switching power supply that can produce an output voltage that is higher than its input voltage.

2. Description of the Related Art

As a boost switching power supply that can produce an output voltage that is higher than its input voltage, there is known, for example, the one represented by the circuit diagram in FIG. 1 of Japanese Patent No. 2,512,670. This circuit consists of a first closed circuit composed of an input power supply, a magnetic coil and a switching means, and a second closed circuit having an input power supply, a diode and a smoothing capacitor. When the switching means is ON, the magnetic coil is excited by electric current flowing to the first closed circuit composed of the input power supply, the magnetic coil and the switching means. When the switching means is OFF, current flows to the second closed circuit composed of the input power supply, the diode and the smoothing capacitor, exciting energy accumulated in the magnetic coil is discharged and the smoothing capacitor is charged. Thus, an output voltage higher than the voltage of the input power supply appears between the electrodes of the smoothing capacitor serving as the output terminals.

Generally in this boost switching power supply, the switching frequency is fixed and the duty factor (defined as the time ratio of switching means ON time to the switching period) is controlled so as to stabilize the output voltage. Because the operation of the device is explained in detail in the publication of the above patent, further explanation for the device will be omitted.

This boost switching power supply has a disadvantage of experiencing a huge recovery current. During the OFF period of the switching device, current equal to the input current flows in the diode. In this condition, however, when the switching means turns ON, the current flow in the diode falls rapidly and recovery current flows in the reverse direction for a short time owing to the characteristic of the diode. This recovery electric current increases in proportion to the magnitude of the current flow in the diode immediately before the switching means turns ON and the rate of decrease of the current in the diode owing to the switching means turning ON. In this boost switching power supply, the only factors operating to suppress the rate of decrease of the current in the diode is are the parasitic impedance contained in the circuit and the resistance arising when the switching device changes from OFF to ON. The rate of decrease of the current flow in the diode is therefore extremely fast and, consequently, a very large recovery current arises. The recovery current decreases the efficiency of the boost switching power supply because it increases the switching loss. Moreover, the switching loss increases in proportion to the drive frequency because it occurs at every switching of the switching means. For this reason, an attempt to miniaturize the boost switching device by increasing the drive frequency leads to increased switching loss. Furthermore, because the pulse wave of the recovery current is extremely steep, a large noise occurs when the huge recovery current starts to flow in the circuit. A sophisticated noise-suppression measure is therefore necessary.

Various methods are available for solving the above mentioned problem of the boost switching power supply disclosed in Japanese Patent No. 2,512,670. The boost switching power supply taught in WO 98/35432 employs one such method.

In the boost switching power supply disclosed in WO 98/35432, the second magnetic coil is inserted into the first closed circuit consisting of the input power supply, the magnetic coil (the first magnetic coil) and the switching means. By intervention of the second magnetic coil, the rate of increase of the current flowing to the switching means when the switching means changes from ON to OFF is restricted. Consequently, the rate of decrease of the current flowing in the diode when the switching device changes from ON to OFF becomes slow and the recovery current can be restricted effectively.

However, in the boost switching power supply disclosed in WO 98/35432, since the second magnetic coil is inserted in the first closed circuit for exciting the first magnetic coil serving as a main coil, current flows constantly in the second magnetic coil for exciting the first magnetic coil. Thus, another problem arises in that the efficiency of the boost switching power supply is degraded. Moreover, because huge current flows in the second magnetic coil, the size of the entire device needs to be enlarged, so that device miniaturization is hampered.

Another method for solving the above-mentioned problem of the boost switching power supply taught in Japanese Patent No. 2,512,670 is that used in the boost switching power supply disclosed in U.S. Pat. No. 5,418,704.

In the boost switching power supply disclosed in U.S. Pat. No. 5,418,704, the second magnetic coil and the second switching means are connected in series and this series connection is connected in parallel with the switching means (the first switching means) to constitute a third closed circuit composed of a smoothing capacitor, second magnetic coil and second switching means. Immediately before the change of the first switching means from OFF to ON, the second switching means is changed from OFF to ON. As pointed out above, in the boost switching power supply taught in the above-mentioned publication, because the second switching means, serving as an auxiliary switch, is changed from OFF to ON immediately before the first switching means, serving as a main switch, changes from OFF to ON, the substantially no recovery current flows into the first switching means. The switching loss occurring in the first switching means is therefore reduced. Furthermore, because the third closed circuit contains the second magnetic coil, the switching loss occurring in the second switching device during the transition from OFF to ON is also reduced.

However, in the boost switching power supply disclosed in U.S. Pat. No. 5,418,704, the transition from ON to OFF of the second switching means is hard switching in which the turn-off is effected while current is flowing. For this reason, turn-off loss occurs in the second switching means.

As indicated above, although various methods have been attempted to lower the switching loss owing to the recovery current, the boost switching power supply by these methods have other problems as mentioned above. For these reasons, a boost switching power supply with low switching loss is desired.

BRIEF SUMMARY OF THE INVENTION

It is therefore an object of the present invention to provide a boost switching power supply with low switching loss.

The above and other objects of the present invention can be accomplished by a boost switching power supply, comprising:

a first magnetic element and a first diode that are serially connected between one terminal of a power source and one terminal of a first capacitor for smoothing;

a first switching element connected between a first node where the first magnetic element and the first diode are connected and the other terminal of the power source;

a second magnetic element and a second switching element that are serially connected between the first node and the other terminal of the power source; and a second diode and a second capacitor that are serially connected between a second node where the second magnetic element and the second switching element are connected and the first node.

According to the present invention, when the second switching element turns ON, the increase in the current flowing in the second switching element is restricted by the second magnetic element. On the other side, when the second switching element turns OFF, the increase in voltage across the electrodes of the second switching element is restricted by the charging the second capacitor. Because of this, the switching loss occurring when the second switching element turns ON and OFF can be reduced substantially. Moreover, by turning ON the first switching element after turning ON the second switching element, the switching loss occurring when the first switching element turns OFF is reduced substantially, and when the first switching element turns OFF, the increase in voltage across the electrodes of the first switching element is restricted by the discharging of the second capacitor. For this reason, the switching loss occurring when the first switching element turns ON and OFF can be reduced substantially.

In a preferred aspect of the present invention, the boost switching power supply further comprises a third diode connected between a third node where the second diode and the second capacitor are connected and the one terminal of the first capacitor.

According to this preferred aspect of the present invention, the current flows to the output via the third diode not only after the second switching element turns OFF and charging of the second capacitor is completed but also when the first switching element turns OFF and the second capacitor discharges because the third diode is provided between the third node and the one terminal of the first capacitor. For this reason, energy can be effectively regenerated.

In a further preferred aspect of the present invention, the boost switching power supply further comprises a third magnetic element inserted between the first node and the second magnetic element, the first magnetic element and the third magnetic element having coils wound on the same magnetic core and polarities of the first and third magnetic element being opposite to each other.

According to this preferred aspect of the present invention, the second magnetic element excited in reverse by the recovery current of the second diode can be reset promptly, and also it becomes possible to regenerate its energy as input via the first magnetic element.

In a further preferred aspect of the present invention, an inductance of the first magnetic element is greater than that of the third magnetic element.

According to this preferred aspect of the present invention, the third magnetic element can be miniaturized.

In a further preferred aspect of the present invention, the boost switching power supply further comprises a fourth diode inserted between the second node and the second diode and a third capacitor connected between a fourth node where the second diode and the fourth diode are connected and the other terminal of the power source.

According to this preferred aspect of the present invention, the switching loss occurring when the second switching element turns OFF can be further reduced because the ascent of the voltage applied across the electrodes of the second switching element is further restricted.

In a further preferred aspect of the present invention, the boost switching power supply further comprises a control circuit for controlling conductive states of the first and second switching elements, the control circuit turning the second switching element ON before turning the first switching element ON and turning the first switching element ON when a voltage at the first node becomes lower than a voltage at the other terminal of the power source.

According to this preferred aspect of the present invention, because the control circuit conducts control to turn the first switching element ON when the voltage at the first node becomes lower than the voltage at the other terminal of the power source, the switching loss when the first switching element turns ON can be reduced.

In a further preferred aspect of the present invention, the boost switching power supply further comprises a fourth diode connected in parallel with the first switching element, the control circuit monitoring electric current flowing through the fourth diode to detect when the voltage at the first node becomes lower than the voltage at the other terminal of the power source.

In a further preferred aspect of the present invention, the boost switching power supply further comprises a third capacitor connected in parallel with the fourth diode.

According to this preferred aspect of the present invention, because the rate of increase of the current flow in the second switching element becomes slow, the switching loss of the second switching element can be reduced further.

In a further preferred aspect of the present invention, the boost switching power supply further comprises a fourth diode connected in parallel with the first switching element and a voltage detection element for detecting a voltage across the terminals of the fourth diode, the control circuit detecting when the voltage at the first node becomes lower than the voltage at the other terminal of the power source based on a voltage detected by the voltage detection element.

In a further preferred aspect of the present invention, the first and second switching elements are one switch selected from the group consisting of a bipolar transistor, MOSFET, IGBT, and BSIT.

The above and other objects of the present invention can also be accomplished by a boost switching power supply, comprising:

a first magnetic element and a first diode that are serially connected between one terminal of a power source and one terminal of a first capacitor for smoothing;

a first switching element connected between a first node where the first magnetic element and the first diode are connected and the other terminal of the power source;

a second magnetic element and a second switching element that are serially connected between the first node and the other terminal of the power source; and a control circuit for controlling conductive states of the first and second switching elements, the control circuit turning the first switching element ON while the second switching element is in an ON state.

In a preferred aspect of the present invention, the boost switching power supply further comprises a second diode and a second capacitor that are serially connected between the second node where the second magnetic element and the second switching element are connected and the first node.

In a further preferred aspect of the present invention, the boost switching power supply further comprises a third magnetic element inserted between the first node and the second magnetic element, the first magnetic element and the third magnetic element having coils wound on the same magnetic core and polarities of the first and third magnetic element being opposite to each other.

In a further preferred aspect of the present invention, the boost switching power supply further comprises a third diode connected between a third node where the second diode and the second capacitor are connected and the one terminal of the first capacitor.

DESCRIPTION OF THE PREFERRED EMBODIMENTS

Preferred embodiments of the present invention will now be explained with reference to the drawings.

Figure 1:
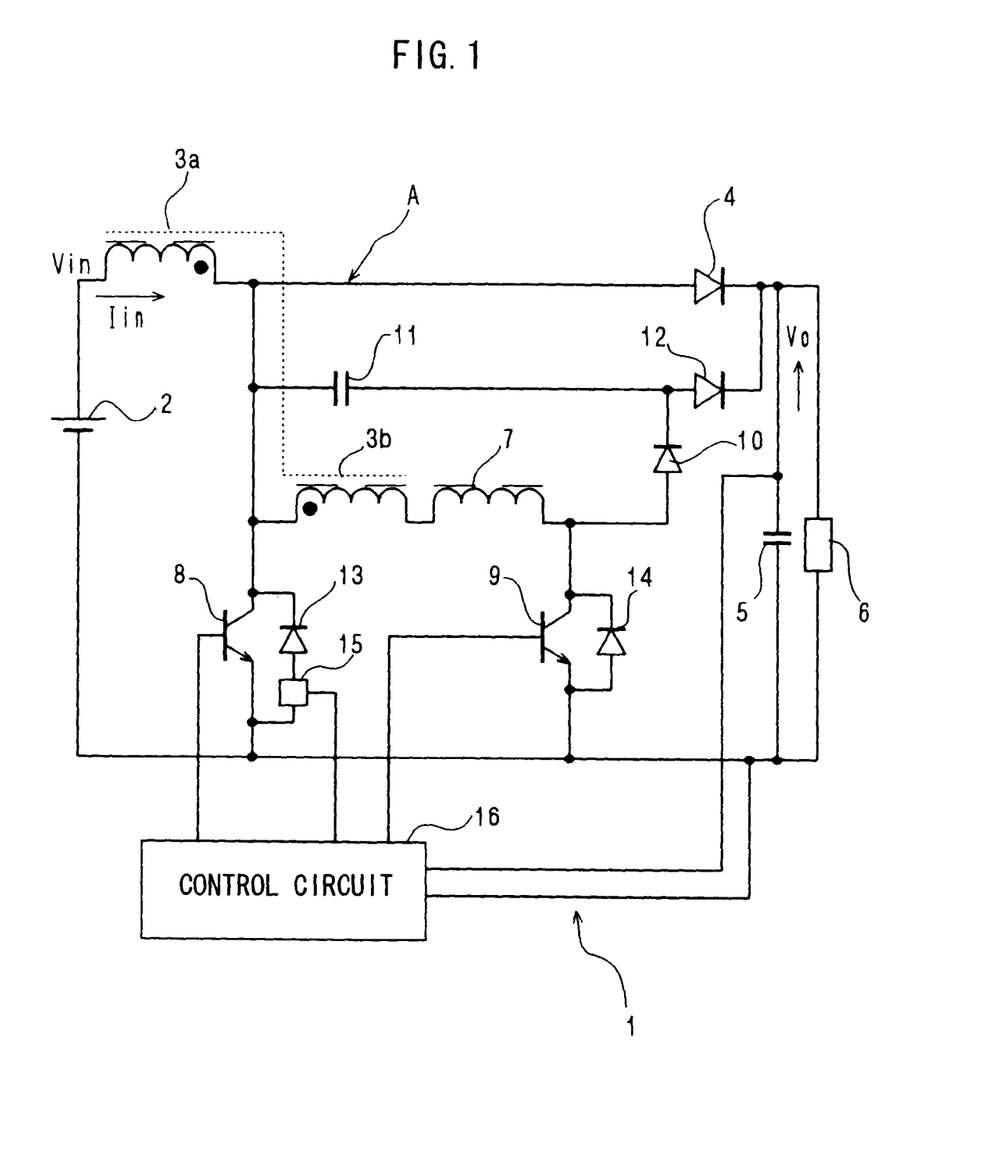
FIG. 1 is a circuit diagram of a boost switching power supply 1 that is a preferred embodiment of the present invention.

FIG. 1 is a circuit diagram of a boost switching power supply 1 that is a preferred embodiment of the present invention.

As shown in FIG. 1, the boost switching power supply 1 of this embodiment comprises a first magnetic element 3 that is divided into a coil portion 3a connected to the positive terminal of a DC power source 2, and a second coil portion 3b; a first diode 4 whose anode is connected to a node between the coil portions 3a and 3b; a first capacitor 5 for output smoothing connected between the cathode of the first diode 4 and the negative terminal of the DC power source 2 (the reference line of the power source); a second magnetic element 7 whose one terminal is connected to the coil portion 3b; a first switching element 8 connected between the anode of the first diode 4 and the negative terminal of the DC power source 2; a second switching element 9 connected between the other terminal of the second magnetic element 7 and the negative terminal of the DC power source 2; a second diode 10 whose anode is connected to the other terminal of the second magnetic element 7; a second capacitor 11 connected between the anode of the first diode 4 and the cathode of the second diode 10; a third diode 12 whose anode is connected to the cathode of the second diode 10 and whose cathode is connected to the cathode of the first diode 4; a fourth diode 13 connected in parallel and reverse direction to the first switching element 8; a fifth diode 14 connected in parallel and reverse direction to the second switching element 9; a current sensing element 15 for detecting current ID4 flowing in the fourth diode 13; and a control circuit 16 for ON/OFF control of the first switching element 8 and the second switching element 9. A load resistance 6 is connected between the electrodes of the first capacitor 5 for output smoothing. As shown in FIG. 1, bipolar transistors are used as the first switching element 8 and second switching element 9 in the boost switching power supply of this embodiment.

By saying that the first magnetic element 3 is divided into the coil portions 3a and 3b is meant that the coil portions 3a and 3b are wound on the same magnetic core. The polarities of the coil portions 3a and 3b of the first magnetic element 3 are opposite to each other. Furthermore, the coil portion 3a has substantially larger inductance than the coil portion 3b.

Figure 2:
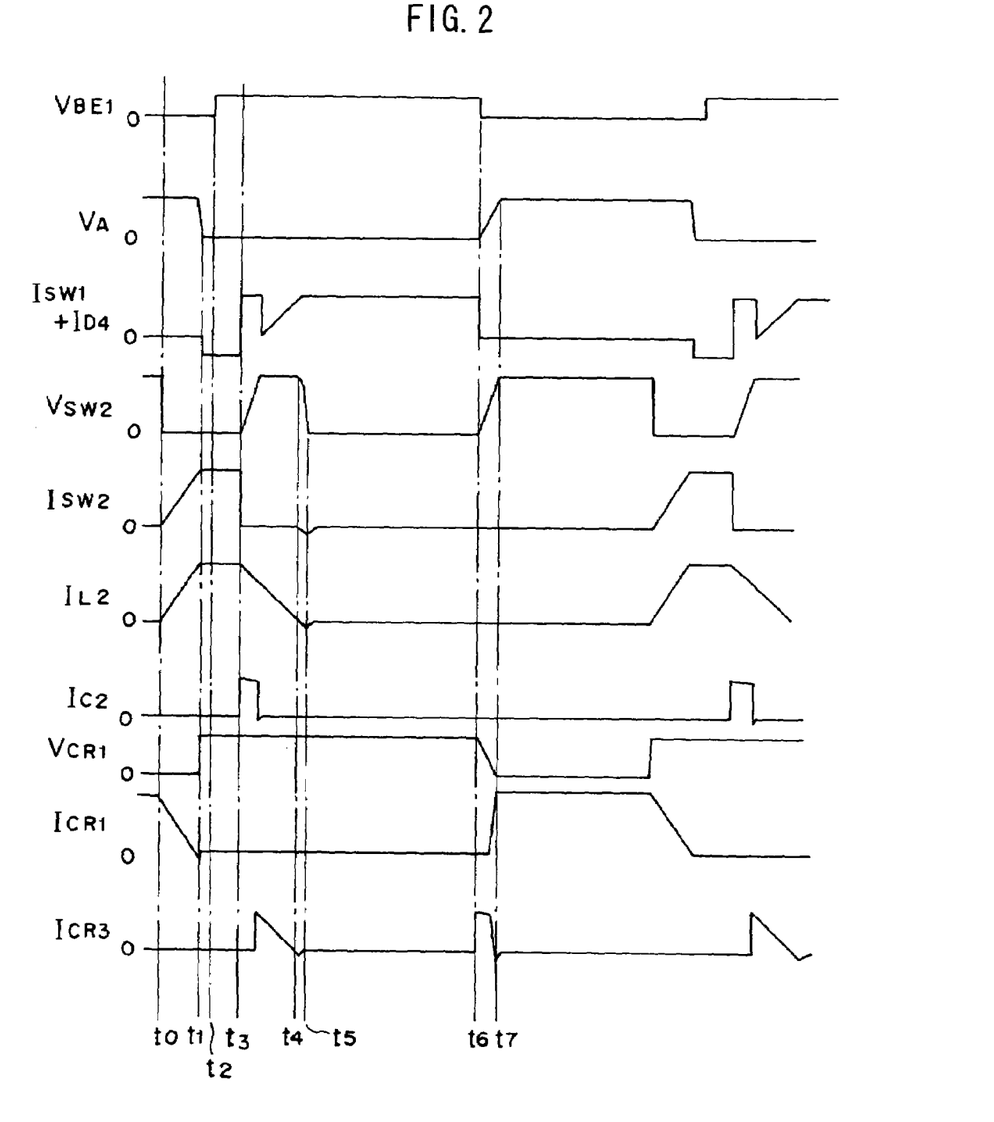
FIG. 2 is a timing chart showing the operation of the boost switching power supplying device 1.

Next, the boost operation of the boost switching power supply 1 of the foregoing circuit configuration will be explained with reference to the timing chart shown in FIG. 2. In FIG. 2, VBE1 indicates the base-emitter voltage of the first switching element 8 and VBE2 indicates the base-emitter voltage of the second switching element 9. Moreover, VA indicates the voltage applied across the first switching element 8, namely, the voltage of the A-line. Isw1 indicates the current flow in the first switching element 8 and Isw2 indicates the current flow in the second switching element 9. Furthermore, ID4 indicates the current flow in the fourth diode 13. Vsw2 indicates the collector-emitter voltage of the second switching element 9. IL2 indicates the current flow in the second magnetic element 7. Ic2 indicates the current flow in the second capacitor 11. Moreover, VCR1 indicates the voltage applied across the electrodes of the first diode 4, and ICR1 indicates the current flow in the first diode 4. Furthermore, ICR3 indicates the current flow in the third diode 12.

First, when both the first switching element 8 and second switching element 9 are in OFF state (before time t0), the voltage applied across the first switching element 8, namely, the voltage VA of the node A is equal to the output voltage Vo, and the current ICR1 equal to the input current Iin flows in the first diode 4.

Next, when an ON signal is supplied to the second switching element 9 (time t0) under the control of the control circuit 16, the voltage Vsw2 across the second switching element 9 rapidly decreases in response, and a voltage equal to the output voltage Vo is applied to the coil portion 3a of the first magnetic element 3 and the second magnetic element 7. Thus, the current Isw2 flowing in the second switching element 9 via the coil portion 3b of the first magnetic element 3 and the second magnetic element 7 increases linearly. Therefore, as mentioned above, the voltage Vsw2 applied across the second switching element 9 decreases rapidly at time t0; however, because of the intervention of the coil portion 3b and the second magnetic element 7, the current Isw2 increases relatively slowly. Thus, scarcely any switching loss arises when the second switching element 9 changes from OFF to ON.

On the other hand, as the current Isw2 flowing in the second switching element 9 increases, the current ICR1 flowing in the first diode 4 decreases. When the current ICR1 becomes zero, recovery current is arises. However, as explained above, since the increase in the current Isw2 flowing in the second switching element 9 is slow, the rate of decrease of the current ICR1 flowing in the first diode 4 is also slow. Consequently, the recovery current occurring in the first diode 4 can be restricted effectively.

When the current ICR1 flowing in the first diode 4 becomes zero (time t1), all of the input current Iin flows through the second magnetic element 7, the voltage VA at the node A becomes substantially zero, and the voltage VCR1 across the first diode 4 becomes substantially equal to the output voltage Vo. At this point, the voltage VB of the node B between the second diode 10 and the second capacitor 11 is substantially equal to the output voltage Vo, and moreover, the voltage across the electrodes of the second capacitor 11 is substantially zero. Furthermore, as the recovery current arising in the first diode 4 decreases, the voltage at the node A becomes slightly negative (since the negative voltage is slight, it is not shown in FIG. 2), and the fourth diode 13 turns ON in response. Namely, the current ID4 flows from the negative terminal of the DC power source 2 to the node A.

Incidence of the current ID4 in the fourth diode 13 is detected by the current sensing element 15 and, in response, the control circuit 16 supplies an ON signal to the first switching element 8 (time t2). When the first switching element 8 changes from OFF to ON, the voltage VA applied across the first switching element 8 is substantially zero (slightly negative), and since the current flowing in the second magnetic element 7 circulates through the loop comprised of the second magnetic element 7, the coil portion 3b, the second switching element 9 and the fourth diode 13, scarcely any switching loss arises when the second switching element 9 changes from OFF to ON. At this point, the current IL2 flowing in the second magnetic element 7 is the input current Iin from the coil portion 3a, and the current Isw2 flowing in the second switching element 9 is equal to the input current Iin.

Next, an OFF signal is supplied to the second switching element 9 (time t3) under the control of the control circuit 16 to change the second switching element 9 from ON to OFF. Because this enables the input current Iin to flow through the first switching element 8, the exciting energy accumulated in the second magnetic element 7 charges the second capacitor 11 via the second diode 10. Consequently, the voltage Vsw2 across the second switching element 9 rises slowly, so that the switching loss occurring when the second switching element 9 changes from ON to OFF can be markedly reduced. When the voltage charged in the second capacitor 11 becomes greater than the output voltage Vo with the result that the voltage Vsw2 across the second switching element 9 rises, the third diode 12 turns ON and the exciting energy accumulated in the second magnetic element 7 is regenerated as the output.

The current passing through the second diode 10 and the third diode 12 decreases with decreasing exciting energy accumulated in the second magnetic element 7. When the current passing through the second diode 10 and the third diode 12 becomes zero (time t4), recovery current arises in the second diode 10 and the third diode 12, so that the second magnetic element 7 is excited in the opposite direction.

As the recovery current occurring in the second diode 10 and the third diode 12 decreases, the voltage across the second switching element 9 changes to negative (since the negative voltage is slight, it is not shown in the FIG. 2), and the fifth diode 14 turns ON in response (time t5). Thus, the current Isw1 passing through the first switching element 8 circulates through the loop composed of the first switching element 8, the fifth diode 14, the second magnetic element 7 and the coil portion 3b. This circulating current raises the exciting energy of the coil portion 3b of the first magnetic element 3, and the exciting energy is regenerated as input via the coil portion 3a magnetically coupled to the coil portion 3b. Specifically, this circulating current rapidly falls to zero because the exciting energy of the coil portion 3b is regenerated as input. The second magnetic element 7 can therefore be reset in a very short period. Subsequently, exciting energy is accumulated in the coil portion 3a owing to the flow of the input current Iin to the first switching element 8.

After the second magnetic element 7 has been reset, the coil portion 3b magnetically coupled to the coil portion 3a produces a voltage that reversely biases the second diode 10 and the third diode 10 and, therefore, no current passes through the second diode 10 or the third diode 12. Consequently, when the second switching element 9 turns ON next, neither the second diode 10 nor the third diode 12 produces recovery current.

An OFF signal is then the supplied to the first switching element 8 at a predetermined timing (time t6) under the control of the control circuit 16, so that the first switching element 8 changes from ON to OFF. As a result, passage of the current Isw1 through the first switching element 8 is blocked and the voltage at the node A rises. However, at the time the first switching element 8 changes from ON to OFF, the second capacitor 11 is already charged to a voltage substantially equal to the output voltage Vo and, therefore, the current Isw1 previously passing through the first switching element 8 is supplied to the output via the second capacitor 11 and the third diode 12 (ICR3). Since the voltage of the second capacitor 11 is therefore gradually discharged, the voltage at the node A rises slowly, so that the switching loss occurring when the first switching element 8 changes from ON to OFF can be markedly reduced.

Moreover, when the voltage at the node A becomes higher than the output voltage Vo with the result that the discharge of the second capacitor 11 is completed (time t7), the first diode 4 turns ON and all of the input current Iin from the coil portion 3a flows to the first diode 4.

By repeating the foregoing operation, the boost switching power supply 1 of this embodiment boosts the voltage supplied from the DC power source 2 to charge the first capacitor 5 and supply the boosted voltage to the load resistance 6. Because of this, the load resistance 6 can utilize a higher voltage than the voltage of the DC power source 2.

Furthermore, the control circuit 16 constantly monitors the voltage across the first capacitor 5, i.e., the output voltage Vo, and controls the duty factor of the first switching element 8 so as to control the output voltage Vo to a predetermined value. Specifically, in the boost switching power supply 1 of this embodiment, the method used to stabilize the output voltage Vo is to maintain the OFF-ON frequency (driving frequency) of the first switching element 8 constant and control its duty factor. In this method, if the output voltage Vo falls below the predetermined value, the duty factor of the first switching element 8 is raised, and if the output voltage Vo rises above the predetermined voltage, the duty factor of the first switching element 8 is lowered.

As explained above, according to the boost switching power supply 1, because the current flows to the loop composed of the coil portion 3b, the second magnetic element 7, the second switching element 9 and the fourth diode 13 at the time the first switching element 8, serving as a main switch, changes from OFF to ON (time t2), the switching loss occurring when the first switching element 8 changes from OFF to ON can be reduced effectively. On the other hand, because the second capacitor 11 is charged to a voltage substantially equal to the output voltage Vo at the time the first switching element 8, serving as a main switch, changes from ON to OFF (time t6), the current passing through the first switching element 8 is regenerated as output via the second capacitor 11 and the third diode 12. In connection with this, because the second capacitor 11 is discharged gradually, the switching loss can be reduced effectively when the first switching element 8 changes from ON to OFF. Therefore, according to this embodiment, an efficient boost switching power supply can be provided wherein the switching loss occurring at the first switching element 8 is extremely small.

Moreover, because the input current Iin passes to the second switching element 9 via the coil portion 3b of the first magnetic element 3 and the second magnetic element 7 at the time the second switching element 9, serving as an auxiliary switch, changes from OFF to ON (time t0), the current increases slowly and the switching loss occurring when the second switching element 9 changes from OFF to ON can be reduced effectively. Also due to this, because the rate of decrease of the current ICR1 passing through the first diode 4 becomes slow, recovery current arising in the first diode 4 can be reduced effectively. On the other hand, because the current passing through the second switching element 9 charges the second capacitor 11 via the second diode 10 at the time the second switching element 9, serving as an auxiliary switch, changes from OFF to ON (time t3), the voltage across the second switching element 9 increases slowly and the switching loss occurring when the second switching element 9 changes from ON to OFF can be reduced effectively. Therefore, according to this embodiment, an efficient boost switching power supply can be provided wherein the switching loss occurring at the second switching element 9 serving as an auxiliary switch is extremely small.

Moreover, although the second magnetic element 7 is excited in the opposite direction when recovery current is produced as a result of decreasing current flow to the second diode 10 and the third diode 12, the second magnetic element 7 can be rapidly reset because the recovery current is regenerated as input via the coil portion 3b magnetically coupled to the coil portion 3b. Also, after the second magnetic element 7 has been reset, the coil portion 3b magnetically coupled to the coil portion 3a generates a voltage that reversely biases the second diode 10 and the third diode 12, so that no recovery current arises in the second diode 10 and the third diode 12 when the second switching element 9 turns ON next.

As explained above, according to this embodiment, a highly efficient boost switching power supply in which the switching loss is extremely small can be provided.

Next, a boost switching power supply that is another preferred embodiment will be explained.

Figure 3:
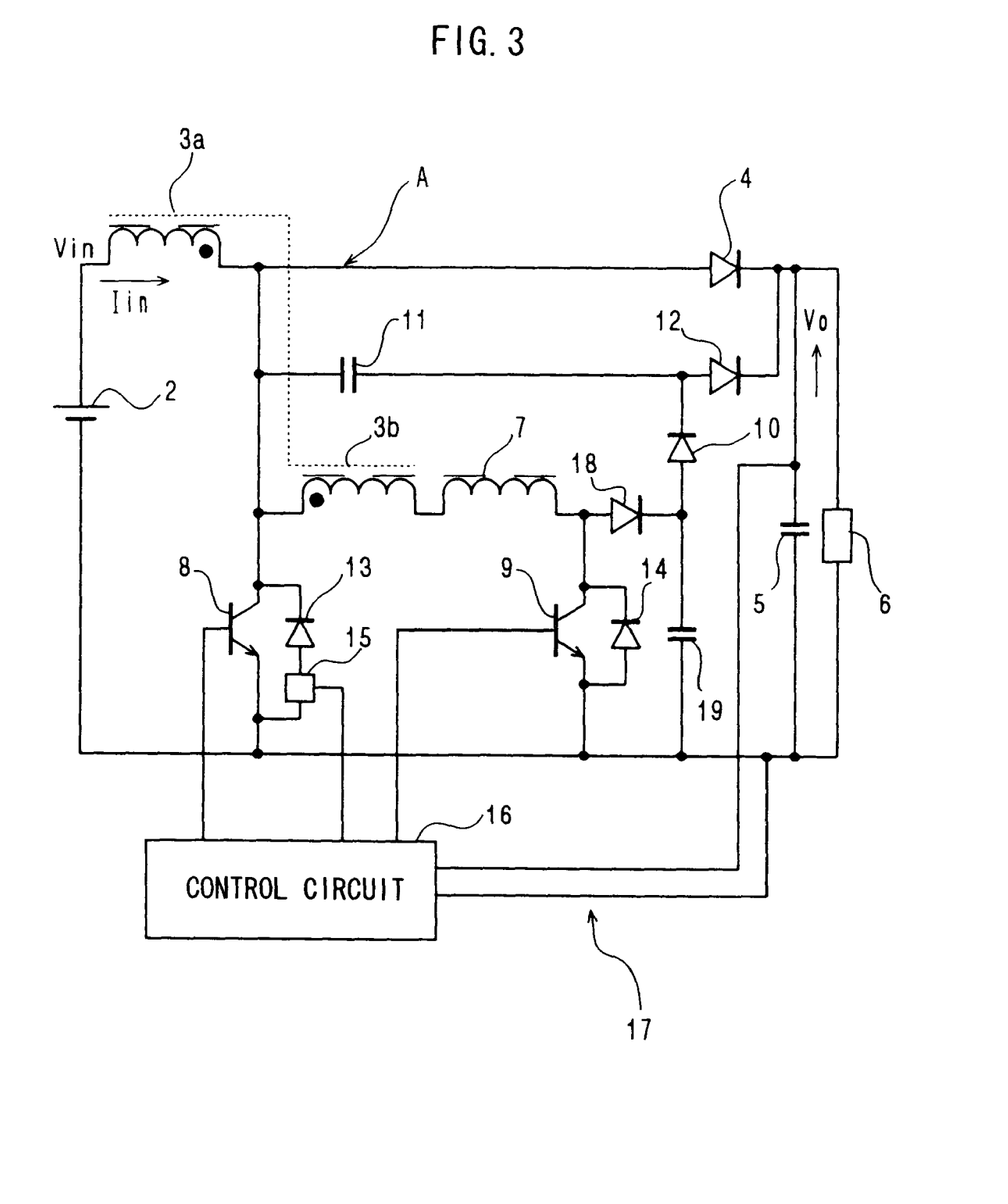
FIG. 3 is a circuit diagram of a boost switching power supply 17 that is another preferred embodiment of the present invention.

FIG. 3 is a circuit diagram of a boost switching power supply 17 that is another preferred embodiment of the present invention.

As shown in FIG. 3, the boost switching power supply 17 of this embodiment has a similar configuration to that the boost switching power supply 1 shown in FIG. 1. It differs from the boost switching power supply 1 shown in FIG. 1 in the point that a sixth diode 18 is inserted between the anode of the second diode 10 and the second switching element 9 and that a third capacitor 19 is inserted between the cathode of the sixth diode 18 and the negative terminal of the DC power source 2.

The operation of the boost switching power supply 17 of this embodiment is basically the same as the operation of the boost switching power supply 1 shown in FIG. 1; however, because the sixth diode 18 and the third capacitor 19 are added, the switching loss occurring when the second switching element 9 changes from OFF to ON is further reduced. Specifically, although the voltage Vsw2 across the second switching element 9 increases rapidly when the second switching element 9 changes from OFF to ON, the rate of increase is restricted because the added sixth diode 18 and the third capacitor 19 work as a time constant circuit. Consequently, the switching loss of the second switching element 9 is reduced.

As explained above, the boost switching power supply 17 of this embodiment achieves a further reduction in the switching loss occurring when the second switching element 9 changes from OFF to ON, on top of that of the boost switching power supply 1 shown in FIG. 1.

Figure 4:
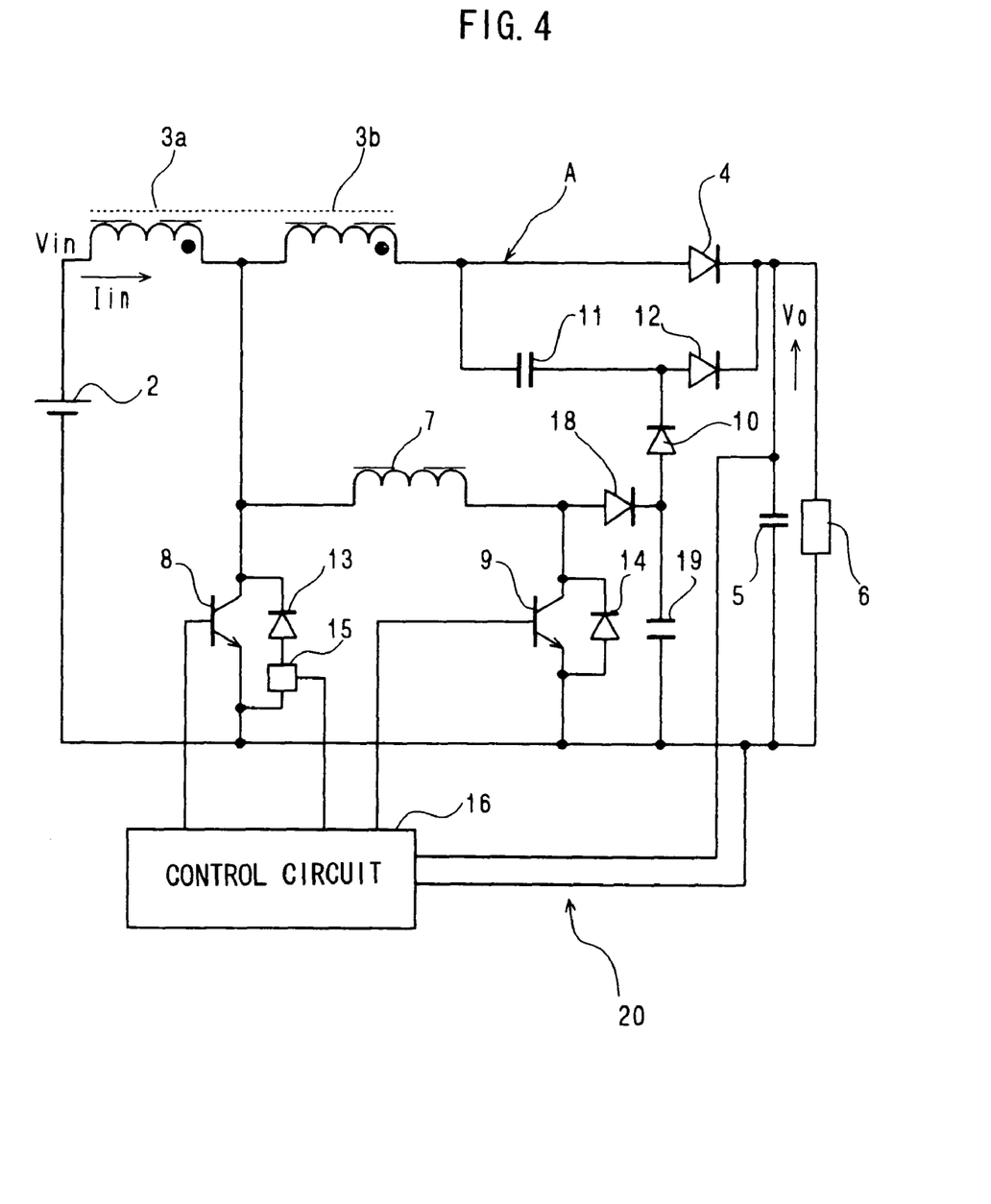
FIG. 4 is a circuit diagram of a boost switching power supply 20 that is a modification of the boost switching power supply 17 shown in FIG. 3.

FIG. 4 is a circuit diagram of a boost switching power supply 20 that is a modification of the boost switching power supply 17 shown in FIG. 3.

As shown in FIG. 4, the boost switching power supply 20 has the same configuration as the boost switching power supply 17 shown in FIG. 3, except that the insertion point of the coil portion 3b is different. Its operation is basically the same as that of the boost switching power supply 17 shown in FIG. 3.

Next, a boost switching power supply according to a further preferred embodiment of the present invention will be explained.

Figure 5:
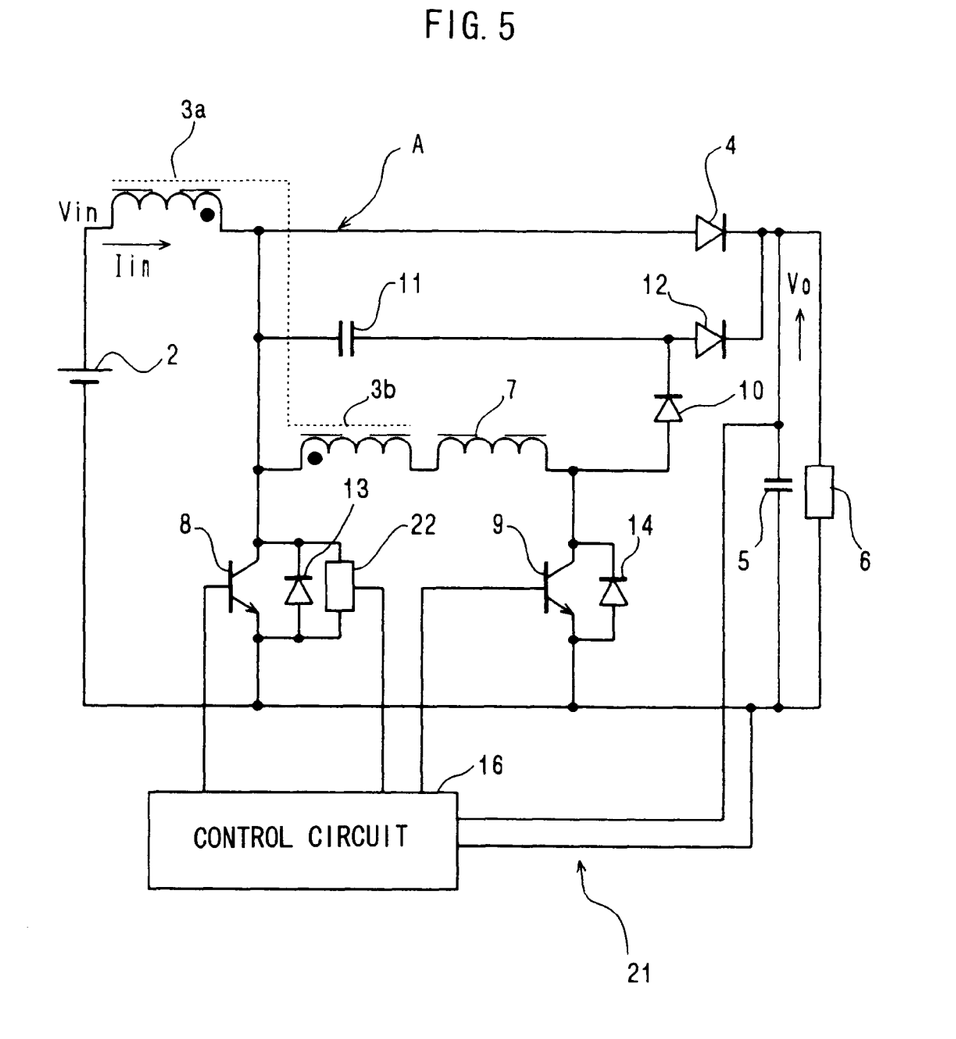
FIG. 5 is a circuit diagram of a boost switching power supply 21 that is a further preferred embodiment of the present invention.

FIG. 5 is a circuit diagram of a boost switching power supply 21 that is a further preferred embodiment of the present invention.

As shown in FIG. 5, the boost switching power supply 21 has a similar configuration to the boost switching power supply 1 shown in FIG. 1. It differs from the boost switching power supply 1 in the point that the current sensing element 15 is eliminated and a voltage sensing element 22 for detecting the voltage across the fourth diode 13 is installed in its place.

The operation of the boost switching power supply 21 is basically same as the operation of the boost switching power supply 1 shown in FIG. 1; however, in the boost switching power supply 21, the voltage detected by the voltage sensing element 22 is used for deciding the time to change the first switching element 8 from OFF to ON. Specifically, in the boost switching power supply 21, when the voltage sensing element 22 detects that the voltage across the fourth diode 13 has reversed to become negative, the control circuit 16 responds by changing the first switching element 8 from OFF to ON. Due to this, the switching loss occurring when the first switching element 8 is changed from OFF to ON can be reduced as in the boost switching power supply 1 shown in FIG. 1.

Next, a boost switching power supply according to a! further preferred embodiment of the present invention will be explained.

Figure 6:
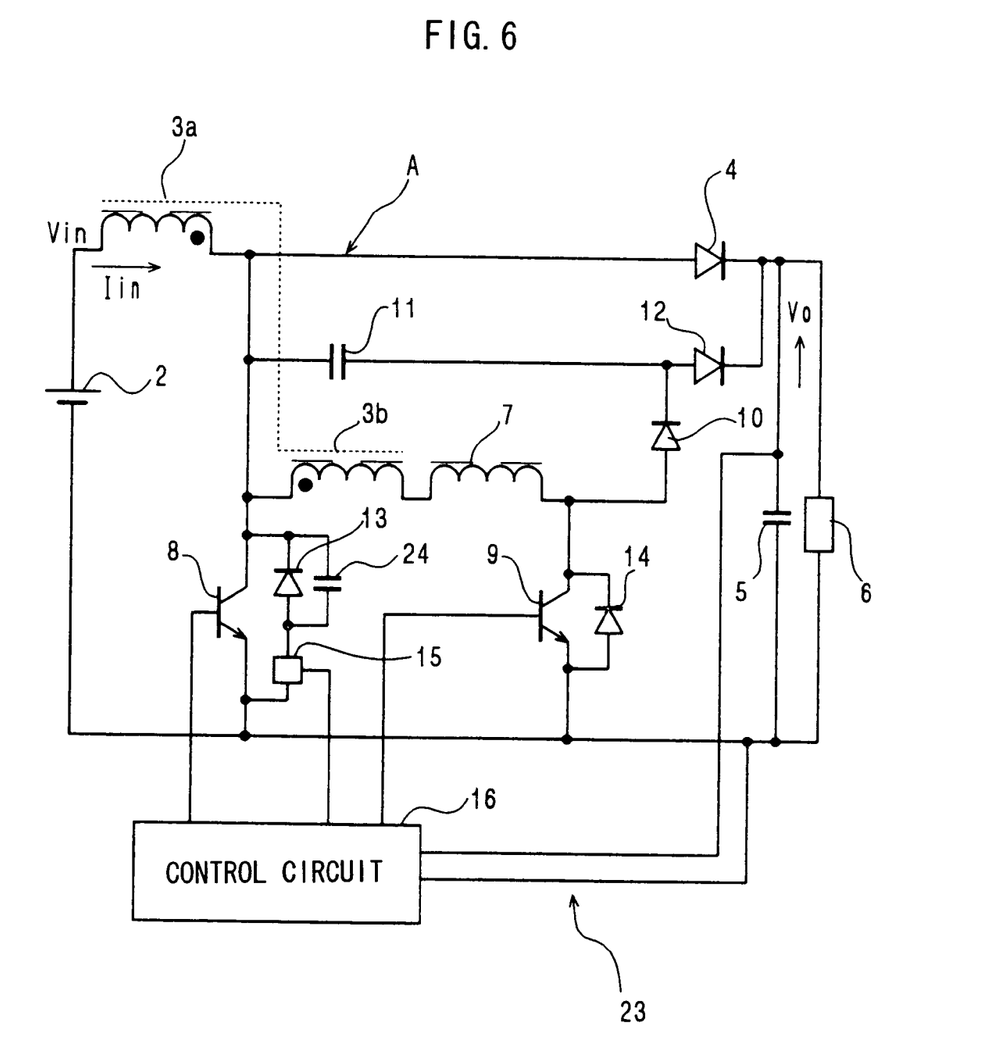
FIG. 6 is a circuit diagram of a boost switching power supply 23 that is a further preferred embodiment of the present invention.

FIG. 6 is a circuit diagram of a boost switching power supply 23 that is a further preferred embodiment of the present invention.

As shown in FIG. 6, the boost switching power supply 23 has a similar configuration to the boost switching power supply 1 shown in FIG. 1. It differs from the boost switching power supply 1 in the point that a fourth capacitor 24 is inserted across and in parallel with the fourth diode 13.

The operation of the boost switching power supply 23 is basically the same as that of the boost switching power supply 1 shown in FIG. 1; however, in the boost switching power supply 23, because a resonant circuit composed of the second magnetic element 7 and the fourth capacitor 24 is established when the second switching element 9 is changed from OFF to ON, the rate of increase of the current Isw2 passing through the second switching element 9 becomes still slower. Consequently, the switching loss of the second switching element 9 is more reduced.

As explained above, the boost switching power supply 23 of this embodiment achieves a further reduction in the switching loss occurring when the second switching element 9 changes from OFF to ON, on top of that of the boost switching power supply 1 shown in FIG. 1.

Figure 7:
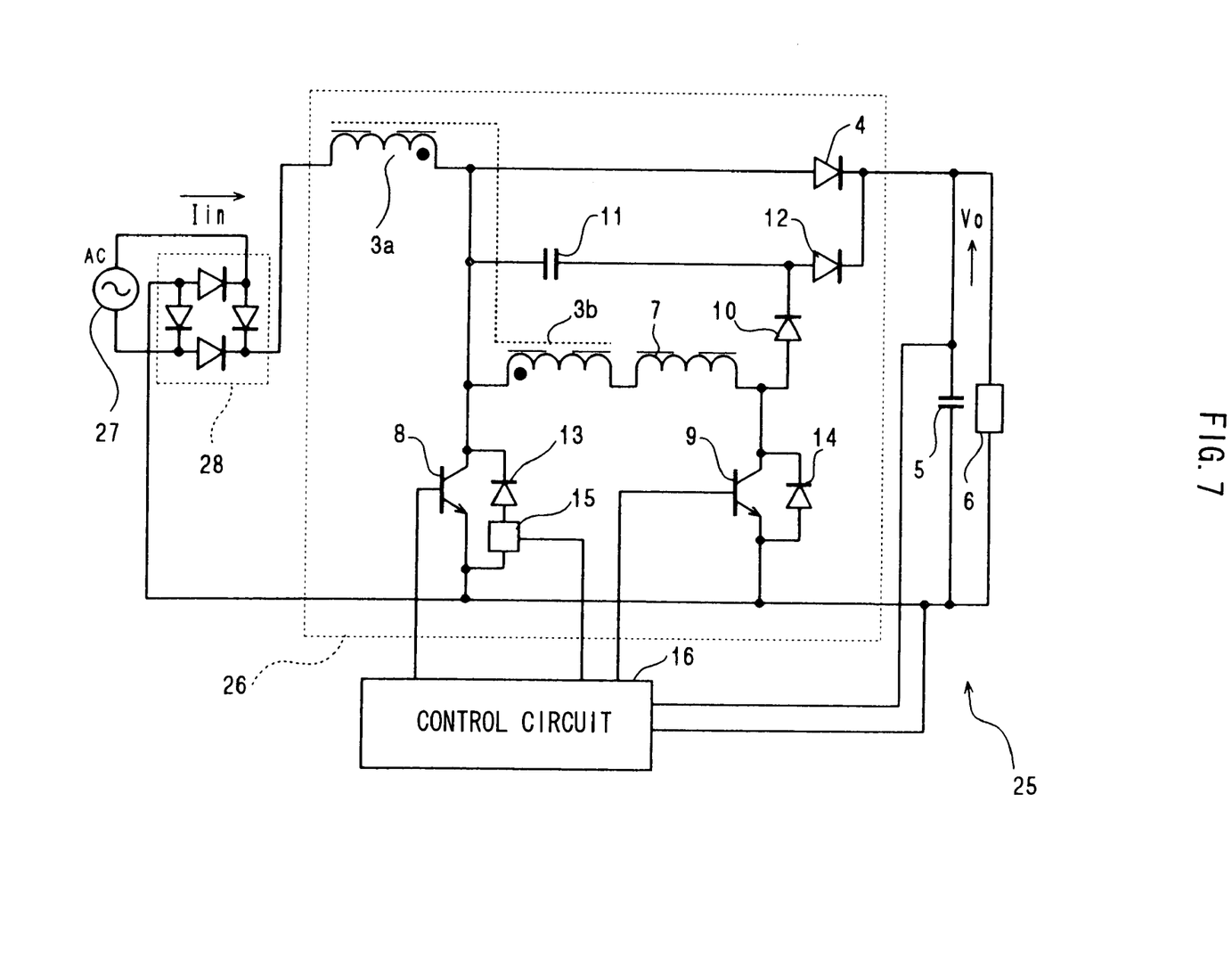
FIG. 7 is a circuit diagram of a boost switching power supply 25 that uses an AC power source instead of the DC power source 2 used in the boost switching power supply 1 shown in FIG. 1.

FIG. 7 is a circuit diagram of a boost switching power supply 25 that uses an AC power source instead of the DC power source 2 used in the boost switching power supply 1 shown in FIG. 1.

As shown in FIG. 7, the boost switching power supply 25 has a boost circuit section 26 whose circuitry is the same as the corresponding portion in the boost switching power supply 1 shown in FIG. 1, and differs from the boost switching power supply 1 in the point that an AC power source 27 is used instead of the DC power source 2. The alternating voltage from the AC power source 27 is rectified by a full-wave rectifier circuit 28 and supplied to the boost circuit section 26. The boost operation of the boost circuit section 26 is the same as that of the boost switching power supply 1 shown in FIG. 1.

It should be noted that the present invention is in no way limited to the details of the arrangements described in the foregoing but changes and modifications may be made without departing from the scope of the appended claims.

For example, in the boost switching power supply of each of the foregoing embodiments, bipolar transistors are used as the first switching element 9 and the second switching element 9; however, the type of switching element is not limited to the bipolar transistor and another type of switching element such as a MOSFET, IGBT or BSIT can be used instead.

Moreover, in the boost switching power supply of each of the foregoing embodiments, the duty factor of the first switching element 8 is controlled based on the voltage of the first capacitor 5 monitored by the control circuit 16 so as to stabilize the output voltage Vo. However, the output voltage Vo can instead be stabilized by controlling the switching frequency of the first switching element 8 while maintaining the duty factor of the first switching element 8 constant.

As explained above, the present invention can provide a boost switching power supply with low switching loss.

All of the above U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A boost switching power supply, comprising:
    a first magnetic element having a coil wound on a first magnetic core and a first diode that are serially connected between one terminal of a power source and one terminal of a first capacitor for smoothing;
    a first switching element connected between a first node where the first magnetic element and the first diode are connected and the other terminal of the power source;
    a second magnetic element and a second switching element that are serially connected between the first node and the other terminal of the power source;
    a second diode and a second capacitor that are serially connected between a second node where the second magnetic element and the second switching element are connected and the first node; and
    a third magnetic element having a coil wound on the first magnetic core and connected between the first node and the second magnetic element, the first magnetic element and the third magnetic element having coils wound on the first magnetic core and the polarities of the first and third magnetic element being opposite to each other causing energy that is in the third magnetic element to be regenerated via the first core as input power to the first magnetic element upon the second switching element transitioning from an ON state to an OFF state.

2. The boost switching power supply as claimed in claim 1 wherein an inductance of the first magnetic element is greater than that of the third magnetic element.

3. The boost switching power supply as claimed in claim 1, further comprising a third diode connected between a third node where the second diode and the second capacitor are connected and the one terminal of the first capacitor.

4. The boost switching power supply as claimed in claim 1, further comprising a fourth diode inserted between the second node and the second diode and a third capacitor connected between a fourth node where the second diode and the fourth diode are connected and the other terminal of the power source.

5. The boost switching power supply as claimed in claim 1 wherein an inductance of the first magnetic element is greater than that of the third magnetic element.

6. The boost switching power supply as claimed in claim 1, further comprising a control circuit for controlling conductive states of the first and second switching elements, the control circuit turning the second switching element ON before turning the first switching element ON and turning the first switching element ON when a voltage at the first node becomes lower than a voltage at the other terminal of the power source.

7. The boost switching power supply as claimed in claim 3, further comprising a control circuit for controlling conductive states of the first and second switching elements, the control circuit turning the second switching element ON before turning the first switching element ON and turning the first switching element ON when a voltage at the first node becomes lower than a voltage at the other terminal of the power source.

8. The boost switching power supply as claimed in claim 7, further comprising a fourth diode connected in parallel with the first switching element, the control circuit monitoring electric current flowing through the fourth diode to detect when the voltage at the first node becomes lower than the voltage at the other terminal of the power source.

9. The boost switching power supply as claimed in claim 8, further comprising a third capacitor connected in parallel with the fourth diode.

10. The boost switching power supply as claimed in claim 7, further comprising a fourth diode connected in parallel with the first switching element and a voltage detection element for detecting a voltage across terminals of the fourth diode, the control circuit detecting when the voltage at the first node becomes lower than the voltage at the other terminal of the power source based on a voltage detected by the voltage detection element.

11. The boost switching power supply as claimed in claim 1 wherein the first and second switching elements are one switch selected from the group consisting of a bipolar transistor, MOSFET, IGBT, and BSIT.

12. A boost switching power supply, comprising:

- a first magnetic element having a coil wound on a first magnetic core and a first diode that are serially connected between one terminal of a power source and one terminal of a first capacitor for smoothing;
- a first switching element connected between a first node where the first magnetic element and the first diode are connected and the other terminal of the power source;
- a second magnetic element having a coil wound on a second magnetic core and a second switching element that are serially connected between the first node and the other terminal of the power source;
- a control circuit for controlling conductive states of the first and second switching elements,
- the control circuit turning the first switching element ON while the second switching element is in an ON state;
- a second diode and a second capacitor that are serially connected between the second node where the second magnetic element and the second switching element are connected and the first node; and
- a third magnetic element having a coil wound on the first magnetic core and connected between the first node and the second magnetic element, the first magnetic element and the third magnetic element having coils wound on the first magnetic core and polarities of the first and third coil windings of the magnetic elements being opposite to each other causing energy that is in the third magnetic element to be regenerated via the first core as input power to the first magnetic element upon the second switching element transitioning from an ON state to an OFF state.

13. The boost switching power supply as claimed in claim 12, further comprising a third diode connected between a third node where the second diode and the second capacitor are connected and the one terminal of the first capacitor.

* * * * *